United States Patent
Wendlandt et al.

(10) Patent No.: US 11,697,403 B2
(45) Date of Patent: Jul. 11, 2023

(54) DEVICE FOR OPEN-LOOP AND CLOSED-LOOP CONTROL OF AN ELECTRO-PNEUMATIC PARKING BRAKE CIRCUIT, ELECTRO-PNEUMATIC HANDBRAKE SYSTEM, VEHICLE AND METHOD FOR OPEN-LOOP AND CLOSED-LOOP CONTROL OF A ELECTRO-PNEUMATIC PARKING BRAKE CIRCUIT

(71) Applicant: WABCO GmbH, Hannover (DE)

(72) Inventors: Alexander Wendlandt, Hannover (DE); Andreas Malaske, Ronnenberg (DE); Axel Peuser, Grossburgwedel (DE); Hartmut Schappler, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 371 days.

(21) Appl. No.: 17/045,490

(22) PCT Filed: Mar. 21, 2019

(86) PCT No.: PCT/EP2019/057117
§ 371 (c)(1),
(2) Date: Oct. 6, 2020

(87) PCT Pub. No.: WO2019/192853
PCT Pub. Date: Oct. 10, 2019

(65) Prior Publication Data
US 2021/0155206 A1    May 27, 2021

(30) Foreign Application Priority Data
Apr. 7, 2018   (DE) .................... 10 2018 002 827.6

(51) Int. Cl.
*B60T 7/10*   (2006.01)
*B60T 13/66*  (2006.01)
(Continued)

(52) U.S. Cl.
CPC .............. *B60T 7/102* (2013.01); *B60T 7/107* (2013.01); *B60T 13/662* (2013.01);
(Continued)

(58) Field of Classification Search
CPC ........ B60T 7/102; B60T 17/221; B60T 7/107; B60T 2270/403; B60T 13/662; B60T 2270/413; H01H 23/12
See application file for complete search history.

(56) References Cited

U.S. PATENT DOCUMENTS 7,821,154 B2 * 10/2010 Hilberer .................. B60T 7/107
                                                          307/9.1
7,884,494 B2    2/2011 Grimm et al.
(Continued)

FOREIGN PATENT DOCUMENTS

| DE | 10333966 A1 | 2/2005 |
| DE | 102005043607 A1 | 3/2007 |

(Continued)

OTHER PUBLICATIONS

Translation of German Patent No. DE 10333966 obtained from website: https://worldwide.espacenet.com on Dec. 6, 2022.*
Translation of European Patent No. EP 1531100 obtained from website: https://worldwide.espacenet.com on Dec. 6, 2022.*

*Primary Examiner* — Pamela Rodriguez
(74) *Attorney, Agent, or Firm* — Leydig, Voit & Mayer, Ltd.

(57) ABSTRACT

A device designed for controlling and regulating an electro-pneumatic parking brake circuit includes a manual controller configured to actuate a parking brake via the electro-pneu-
(Continued)

matic parking brake circuit, the manual controller having a first circuit arrangement and a second circuit arrangement, the first circuit arrangement being a digital, bidirectional circuit arrangement and the second circuit arrangement being an analog circuit arrangement. The device further includes control electronics electrically connected to the manual controller. The first circuit arrangement is connected to the control electronics via a first connection cable and the second circuit arrangement is connected to the control electronics via a second connection cable. The first connection cable is a digital data transmission channel configured to enable a digital data transmission between the digital circuit arrangement and the control electronics. The second connection cable is an analog data transmission channel configured to enable an analog data transmission.

14 Claims, 3 Drawing Sheets

(51) Int. Cl.
*B60T 17/22* (2006.01)
*H01H 23/12* (2006.01)

(52) U.S. Cl.
CPC ........... *B60T 17/221* (2013.01); *H01H 23/12* (2013.01); *B60T 2270/403* (2013.01); *B60T 2270/413* (2013.01)

(56) References Cited

U.S. PATENT DOCUMENTS

| | | |
|---|---|---|
| 2005/0029859 A1 | 2/2005 | Bensch et al. |
| 2009/0099746 A1 | 4/2009 | Hilberer |

FOREIGN PATENT DOCUMENTS

| | | |
|---|---|---|
| EP | 1504975 B1 | 2/2005 |
| EP | 1531100 A2 | 5/2005 |
| EP | 1719677 A2 | 11/2006 |
| EP | 1966016 B1 | 9/2008 |
| EP | 2942249 A1 | 11/2015 |
| WO | WO 9938738 A1 | 8/1999 |
| WO | WO 0029268 A1 | 5/2000 |
| WO | WO 2017089521 A1 | 6/2017 |

* cited by examiner

DEVICE FOR OPEN-LOOP AND CLOSED-LOOP CONTROL OF AN ELECTRO-PNEUMATIC PARKING BRAKE CIRCUIT, ELECTRO-PNEUMATIC HANDBRAKE SYSTEM, VEHICLE AND METHOD FOR OPEN-LOOP AND CLOSED-LOOP CONTROL OF A ELECTRO-PNEUMATIC PARKING BRAKE CIRCUIT

CROSS REFERENCE TO RELATED APPLICATIONS

This application is a U.S. National Phase Application under 35 U.S.C. § 371 of International Application No. PCT/EP2019/057117, filed on Mar. 21, 2019, and claims benefit to German Patent Application No. DE 10 2018 002 827.6, filed on Apr. 7, 2018. The International Application was published in German on Oct. 10, 2019 as WO 2019/192853 under PCT Article 21(2).

FIELD

The invention relates to a device for controlling and regulating an electro-pneumatic parking braking circuit as well as an electro-pneumatic handbrake system (EPH system), a vehicle and a method for controlling and regulating an electro-pneumatic parking braking circuit.

BACKGROUND

Road or rail vehicles regularly have an electro-pneumatic parking brake circuit for actuating a parking brake. The parking brake is used, for example, as a parking brake or as an emergency brake. Typically, an electro-pneumatic parking brake circuit includes a compressed air supply, pneumatic lines, and electro-pneumatic valves to supply spring-loaded brake cylinders with compressed air via a spring-loaded connection. An electro-pneumatic parking brake circuit is usually controlled by means of control electronics (ECU) connected via electrical cables to the corresponding electro-pneumatic valves of the parking brake circuit.

The parking brake of a vehicle is regularly actuated by means of a manual control unit, such as a button, which may be integrated into the dashboard of the vehicle, for example, or located elsewhere in the vehicle cabin. The manual control unit is connected via connecting cables to the control electronics (ECU) for controlling the parking brake circuit. The control electronics (ECU) receives a control signal from the manual control unit, evaluates the control signal and controls the electro-pneumatic valves of the parking brake circuit accordingly.

It is typically provided that a parking brake can be applied even when the ignition is switched off, wherein the control electronics has a permanent power supply. Another challenge of the implementation of a parking brake actuated by a manual control unit is that the manual control unit and the control electronics (ECU) for controlling the parking brake circuit can be far apart from each other. For example, in a truck with a trailer, the distance between the manual control unit and the control electronics (ECU) can be between 7 and 12 meters. On the part of the users of a parking brake, continuous proportional control of the parking brake by means of a manual control unit is regularly required, as described in EP 1504975 B11. A status lamp in the dashboard of a vehicle is also required to indicate the status of the parking brake. In the event that a vehicle has a trailer with a trailer parking brake, a test function of the trailer parking brake as well as overrun brake actuation of the trailer with the manual control unit should typically be possible.

In order to increase the reliability of the transmission of the control signal from a manual control unit to the control electronics (ECU), the manual control unit usually comprises a dual circuit transmission device with a first circuit arrangement and a circuit arrangement which is redundant in relation to the first circuit arrangement. The first circuit arrangement and the redundant circuit arrangement are typically executed redundantly when actuating the manual control unit and are connected to the control electronics (ECU) via connection cables. Due to the dual circuit transmission device, the transmission of a control signal from the manual control unit to the control electronics (ECU) and thus the actuation of the parking brake is possible even in the event of a failure or a defect of one of the two circuit arrangements of the manual control unit.

Thus, a device for controlling and regulating an electro-pneumatic parking brake circuit according to the generic term of claim 1 with a manual control unit with dual circuit analog transmission devices for transmitting control signals from the manual control unit to control electronics is known for example from EP 1966016 B1. There, a button for actuating an electro-pneumatic handbrake (EPH) in road vehicles is described, with control electronics (ECU) connected via connecting cables. The control electronics are used for the evaluation of the button as well as for controlling the EPH. For switching position detection and/or fault detection of the button, the potentials of the connection cables of the button are evaluated by means of the ECU. Here, two parallel, identical, mechanically coupled switching groups—switching group 1 and switching group 2—are provided, which are jointly actuated by means of a first button for alternating application and release of the handbrake (EPH). The two redundant switching groups each contain two switches, which are connected to the connection cables with their bases, and each of which contacts a first resistor by means of their switching poles when the button is in its rest state.

SUMMARY

In an embodiment, the present invention provides a device designed for controlling and regulating an electro-pneumatic parking brake circuit. The device includes a manual controller configured to actuate a parking brake via the electro-pneumatic parking brake circuit, the manual controller having a first circuit arrangement and a second circuit arrangement, the first circuit arrangement being a digital, bidirectional circuit arrangement and the second circuit arrangement being an analog circuit arrangement. The device further includes control electronics electrically connected to the manual controller. The first circuit arrangement is connected to the control electronics via a first connection cable and the second circuit arrangement is connected to the control electronics via a second connection cable. The first connection cable is a digital data transmission channel configured to enable a digital data transmission between the digital circuit arrangement and the control electronics. The second connection cable is an analog data transmission channel configured to enable an analog data transmission from the analog circuit arrangement to the control electronics. The digital circuit arrangement and the analog circuit arrangement are redundantly and simultaneously actuatable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
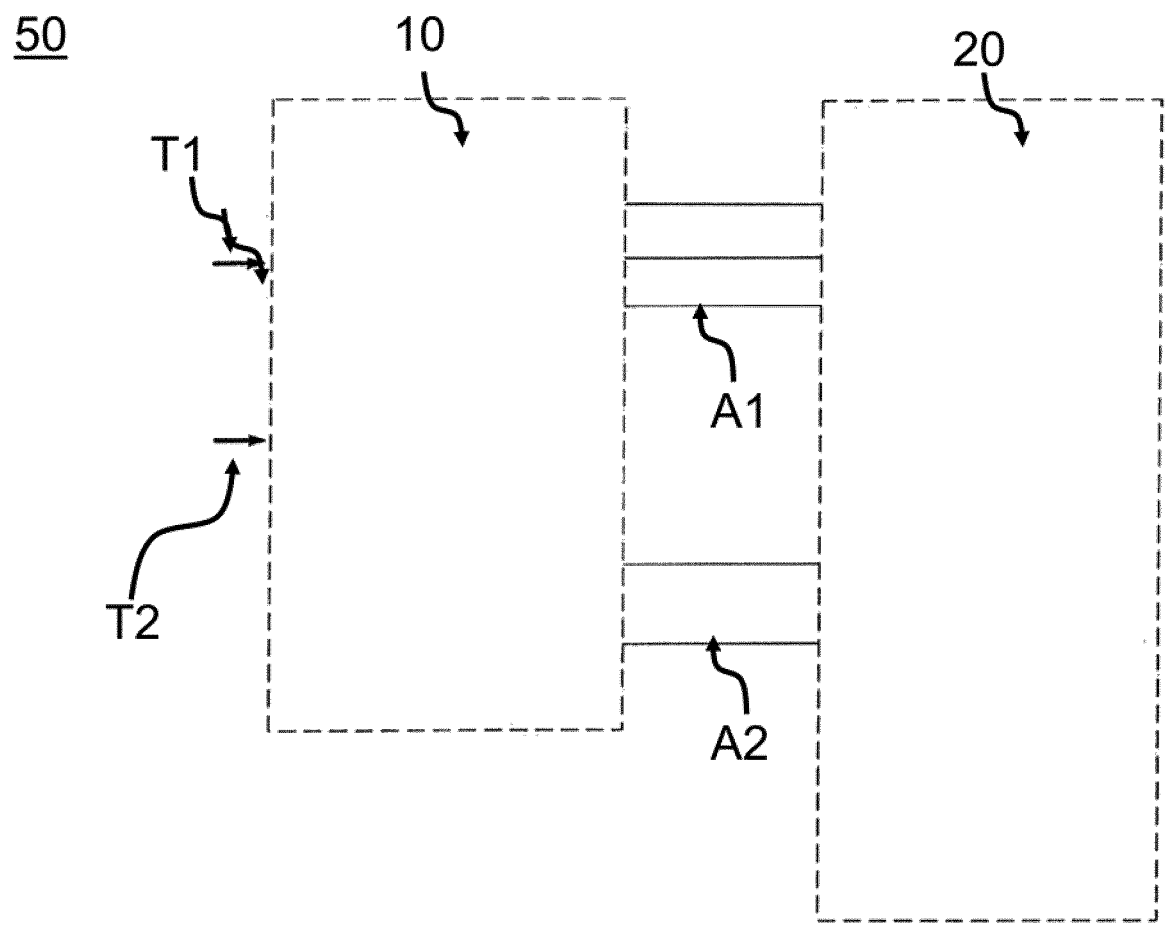
FIG. 1 shows a schematic representation of the exterior view of a preferred embodiment of the device for controlling and regulating an electro-pneumatic parking brake circuit.

Hand control units with purely analog dual circuit transmission devices or bidirectional transmission devices, in particular those which are based only on a data transmission channel, namely for the analog transmission of control signals from a manual control unit to control electronics, are however not up to the requirements mentioned above.

First of all, due to the high safety requirements as well as the large number of other features requested on the user side, a manual control unit with a reliable dual circuit transmission device for the reliable transmission of control signals to control electronics is desirable. However, a manual control unit with a dual circuit transmission device should also have high availability and flexibility and allow bidirectional data transfer with control electronics.

The present disclosure provides a device and a method by means of which the reliable transmission of control signals from a manual control unit to control electronics can be achieved and by which, in particular, at least some of the further features requested on the user side are implemented. In particular, a manual control unit is provided with a reliable dual circuit and therefore comparatively reliable transmission device for transmitting control signals to control electronics, which at the same time meets the high safety requirements and enables the realization of at least a number of further features requested on the user side.

The present disclosure provides a device for controlling and regulating an electro-pneumatic parking brake circuit, which has a manual control unit (HCU) for actuating a parking brake by means of the electro-pneumatic parking brake circuit and has control electronics (ECU) electrically connected to the manual control unit (HCU) for controlling the electro-pneumatic parking brake circuit. The manual control unit (HCU) comprises a first circuit arrangement and a second circuit arrangement. The first circuit arrangement is connected to the control electronics (ECU) at least via a first connection cable and the second circuit arrangement is connected to the control electronics (ECU) at least via a second connection cable.

The first circuit arrangement and the second circuit arrangement are actuatable redundantly, preferably simultaneously.

According to the present disclosure, for such redundant first and second circuit arrangements it is provided that the first circuit arrangement is a digital circuit arrangement, and the at least first connection cable is a digital data transmission channel, which is designed to enable a digital data transmission between the digital circuit arrangement and the control electronics (ECU).

The second circuit arrangement is an analog circuit arrangement, and the at least second connection cable is an analog data transmission channel, which is designed to enable an analog data transmission from the analog circuit arrangement to the control electronics (ECU).

According to the present disclosure, therefore, for such analog and digital circuit arrangements it is provided that these are actuatable redundantly, preferably simultaneously.

The present disclosure is based on the consideration that a dual circuit redundant transmission device is fundamentally useful to meet the high safety requirements. The present disclosure is now based on the realization that the above-mentioned requirements can also be met by a dual circuit transmission device with a first digital circuit arrangement and a second analog circuit arrangement which can be actuated redundantly relative to the digital circuit arrangement.

The redundant digital circuit arrangement and the analog circuit arrangement are in particular electrically independent of each other, i.e. the circuit of the digital circuit arrangement and the circuit of the analog circuit arrangement are not electrically connected to each other but nevertheless are preferably actuatable simultaneously. In particular, the digital data transmission channel and the analog data transmission channel are mutually independent and conduct independent control signals. However, the digital circuit arrangement and the analog circuit arrangement are operated redundantly at the same time, i.e. the circuit of the digital circuit arrangement and the circuit of the analog circuit arrangement are closed at the same time, so that a current can flow. The digital circuit arrangement and the analog circuit arrangement can be used for different functions. The redundant digital and analog circuit arrangements are provided redundantly for the same function. Advantageously, in the event of a failure of the digital circuit arrangement, the redundant analog circuit arrangement can take over the function, for example, applying the parking brake, of the failed digital circuit arrangement and can transmit corresponding control signals to control electronics (ECU) by means of the analog data transmission channel. For example, in the event of an error message, the data transmission of certain control signals can be changed from the failed digital circuit arrangement to the redundant analog circuit arrangement. This ensures high availability even in the event of a first fault.

A transmission of a temporally continuous electrical signal takes place via the analog data transmission channel. It is therefore a smooth function in the mathematical sense. The redundant analog data transmission channel can be used to switch on (wake up) the control electronics (ECU) in the event that a vehicle is not in operation and is started by turning an ignition key, for example. The control electronics (ECU) then evaluates the received data signals and controls the application or release of a parking brake accordingly. During vehicle operation, the analog data transmission channel can be used for the emergency function in the event of a first fault.

A transmission of a temporally discrete electrical signal takes place via the digital data transmission channel, wherein this can comprise an arbitrary dynamic range. However, the digital signal can also be a binary-only signal. In the mathematical sense, the digital signal can be described by a step function. For example, the digital data transfer channel can be used to control display elements of different designs which are addressed by the control electronics (ECU).

The analog and digital data transfer channels are preferably monitored separately according to different principles. The analog data transmission channel can be monitored, for example, by checking the voltage range. The digital data transmission channel can be monitored, for example, by calculating the checksum, or by attaching message counters to the data transmission or by checking a timeout during the data transmission.

Preferably, the digital data transmission channels are also bidirectional. The back channel of a bidirectional digital data transmission channel can also be used for diagnostic purposes or for error signaling. In particular, the digital channel can be used to achieve a stepless requirement.

In a particularly preferred development, it is provided that the manual control unit has a first button and the digital circuit arrangement has a first switching contact and the analog circuit arrangement has a first redundant switching contact, wherein the first switching contact and the first redundant switching contact can be actuated by the first button. The first button is intended for activation or deactivation of at least one parking brake. The button is preferably a single button with the two switching positions, "actuated" and "not actuated".

In one embodiment, it is provided that the wake-up function is also executed via a digital data transmission channel. The wake-up function is used to switch on (wake up) the control electronics (ECU). The wake-up function is especially required when starting a vehicle. The control electronics (ECU) then evaluates the data signals received from the manual control unit and controls the application or release of the parking brake accordingly.

In a particularly preferred development, the digital and analog data transmission channels are used point-to-point between the manual control unit and the control electronics (ECU). The analog and the digital data transmission channels are therefore preferably electrically independent of each other. The point-to-point connection advantageously prevents the digital and the analog data transmissions from being affected by sources of interference.

In one embodiment it is provided that the manual control unit also has a second button and the digital circuit arrangement has a second switching contact and the analog circuit arrangement has a second redundant switching contact. The second switching contact and the second redundant switching contact can be operated by the second button. The second button is provided to activate a trailer test function. The trailer test function is preferably designed in such a way that the service brake of the trailer is released during the test when the parking brake is applied. This allows a check of whether the parking brake of the towing vehicle can hold the entire vehicle combination safely, i.e. the towing vehicle with the trailer.

In a particularly preferred embodiment, it is provided that the first button and the second button each have electrically independent switching contacts. These preferably parallel guided independent switching contacts are preferably operated simultaneously. In a preferred embodiment, the first button and the second button are designed as a double rocker button.

In one development, it is provided that the analog circuit arrangement is provided for an emergency function in the event of a first fault and for wake-up of the control electronics and the digital circuit arrangement is provided for a main signal transmission. The emergency function is preferably designed in such a way that the data transmission is switched to the analog data transmission in the event of an error message, which is triggered for example by a failure of the digital main signal transmission. For the analog data transmission, the respective switching states of the first and second redundant switching contacts, determined by the first and the second buttons, is decisive. The activation of the emergency function is preferably automatic, especially in the event of failure of the main digital signal transmission.

The main digital signal transmission typically includes a data transmission for controlling the status LED, a data transmission about the status of the first and second buttons, a data transmission for protocol protection (for example message counter, check sum) as well as the transfer of data in which diagnostic information is encoded.

In a preferred embodiment, it is provided that the digital circuit arrangement has an interface module, which transmits a piece of information about a switching state of the first switching contact and/or a piece of information about a switching state of the second switching contact to the control electronics (ECU) via a digital data transmission channel.

The interface module is, for example, a LIN or CAN interface and measures the state of the first switching contact and the second switching contact of the digital circuit arrangement via a digital input of the interface module. The information about the switching state of the first switching contact and the second switching contact of the digital circuit arrangement can then be transmitted to the control electronics (ECU) via a bidirectional digital data transmission channel.

In the interface module, a manually actuated proportional encoder signal can also be read in. For example, the interface module can be used to control display elements such as a function monitoring lamp or a fault monitoring lamp, which can be integrated into an operating element in the vehicle, for example.

In a preferred development, it is provided that the first redundant switching contact and/or the second redundant switching contact of the analog circuit arrangement are provided twice. A double design of the respective switching contacts can lead to an increase in functional reliability.

In a preferred development, it is provided that the first switching contact and/or the second switching contact of the digital circuit arrangement are provided twice. A double design of the respective switching contacts can lead to an increase in functional reliability.

In one embodiment, it is provided that the digital data transmission channel is designed as a LIN bus or as a CAN bus. In the event that the digital data transmission channel is implemented as a LIN bus, three cable wires are required between the digital circuit and the control electronics (ECU). In the event that the digital data transmission channel is designed as a CAN bus, four cable wires are required between the digital circuit and the control electronics (ECU).

In a preferred embodiment, it is provided that the digital circuit arrangement also has a proportional encoder, which transmits a proportional encoder signal to an interface module.

In one development, it is provided that the proportional encoder is mechanically coupled to the first button. Advantageously, operation can be simplified by the mechanical coupling of the proportional encoder to the first button.

According to a second aspect of the present disclosure, an electro-pneumatic handbrake (EPH) system is provided, having at least one electro-pneumatic parking brake circuit with at least one spring storage brake cylinder for releasing and applying at least one parking brake and a device designed for controlling and regulating the electro-pneumatic parking brake circuit. The device is designed according to at least one of the previously mentioned embodiments.

According to a third aspect of the present disclosure, a vehicle is provided, which has an electro-pneumatic hand brake (EPH) system designed according to the second aspect.

According to a fourth aspect of the present disclosure, a method of controlling and regulating an electro-pneumatic parking brake circuit is provided for actuating a parking brake, including actuation of a first circuit arrangement and a redundant second circuit arrangement of a manual control unit, transmission of control signals at least via a first connection cable from the first circuit arrangement to control electronics (ECU), and transmission of control signals at least via a second connection line from the redundant second circuit arrangement to the control electronics (ECU), wherein the first circuit arrangement is a digital circuit arrangement, and the at least first connection cable is a digital data transmission channel, by means of which a digital data transmission between the digital circuit arrangement of the manual control unit (HCU) and the control electronics (ECU) is enabled and the redundant second circuit arrangement is an analog circuit arrangement, and the at least second connection cable is an analog data transmission channel by means of which an analog data transmission from the analog circuit arrangement of the manual control unit to the control electronics (ECU) is enabled.

Embodiments are now described below on the basis of the drawing. This is not necessarily intended to represent the embodiments to a scale, but rather the drawing is executed in a schematized and/or slightly distorted form where this is useful for explanation. With regard to additions to the teachings immediately recognizable from the drawing, reference is made to the relevant prior art. It must be taken into account that various modifications and changes regarding the form and detail of an embodiment can be made without deviating from the general idea of the invention. The features of the invention disclosed in the description, in the drawing and in the claims may be essential for the further development of the invention, both individually and in any combination. In addition, all combinations of at least two of the features disclosed in the description, the drawing and/or the claims fall within the scope of the present disclosure. The general idea of the invention is not limited to the exact form or detail of the preferred embodiments shown and described below or limited to a subject-matter which would be limited in comparison to the subject-matter claimed in the claims. In the case of specified design ranges, values within the specified limits should also be disclosed as limit values and be usable and claimable at will. For simplicity, the same reference characters are used below for identical or similar parts or parts with identical or similar functions.

FIG. 1 shows schematically the exterior view of a device 50 for controlling and regulating an electro-pneumatic parking brake circuit which is not shown here. The device 50 comprises a manual control unit (HCU) 10, which is connected to the control electronics (ECU) 20 by means of digital connection cables A1 and analog connection cables A2.

The embodiment shown can be used, for example, for actuating an electro-pneumatic parking brake. In this case, the control electronics (ECU) 20 would be connected to a number of electro-pneumatic valves, which are not shown here, of an electro-pneumatic parking brake circuit.

In the diagram shown, the digital connection cables A1 allow bidirectional signal transmission, so that, for example, the status of the parking brake could be indicated by means of a status indicator, for example a signal lamp, which could be integrated into a vehicle dashboard which is not shown here.

The digital connection cables A1 can be designed, for example, as a CAN bus or as a LIN bus. In the event that the digital connection cables are implemented as a LIN bus, three data transmission channels are required between a manual control unit (HCU) and the control electronics (ECU). In the event that the digital connection cables are designed as a CAN bus, four data transmission channels are required between a manual control unit (HCU) and the control electronics (ECU).

In the exemplary embodiment shown, a first button T1 and a second button T2 are provided. The first button T1 is provided for applying and releasing a parking brake which is not shown here. The second button T2 is provided to activate a trailer test function. In a representation which is not shown, a first button and a second button are integrated into the dashboard of a vehicle.

When actuating the button T1 or the button T2, a corresponding control signal is transmitted to the control electronics (ECU) 20 via the digital connection cables A1 and/or the analog connection cables A2 and is evaluated by the control electronics (ECU) 20.

Figure 2:
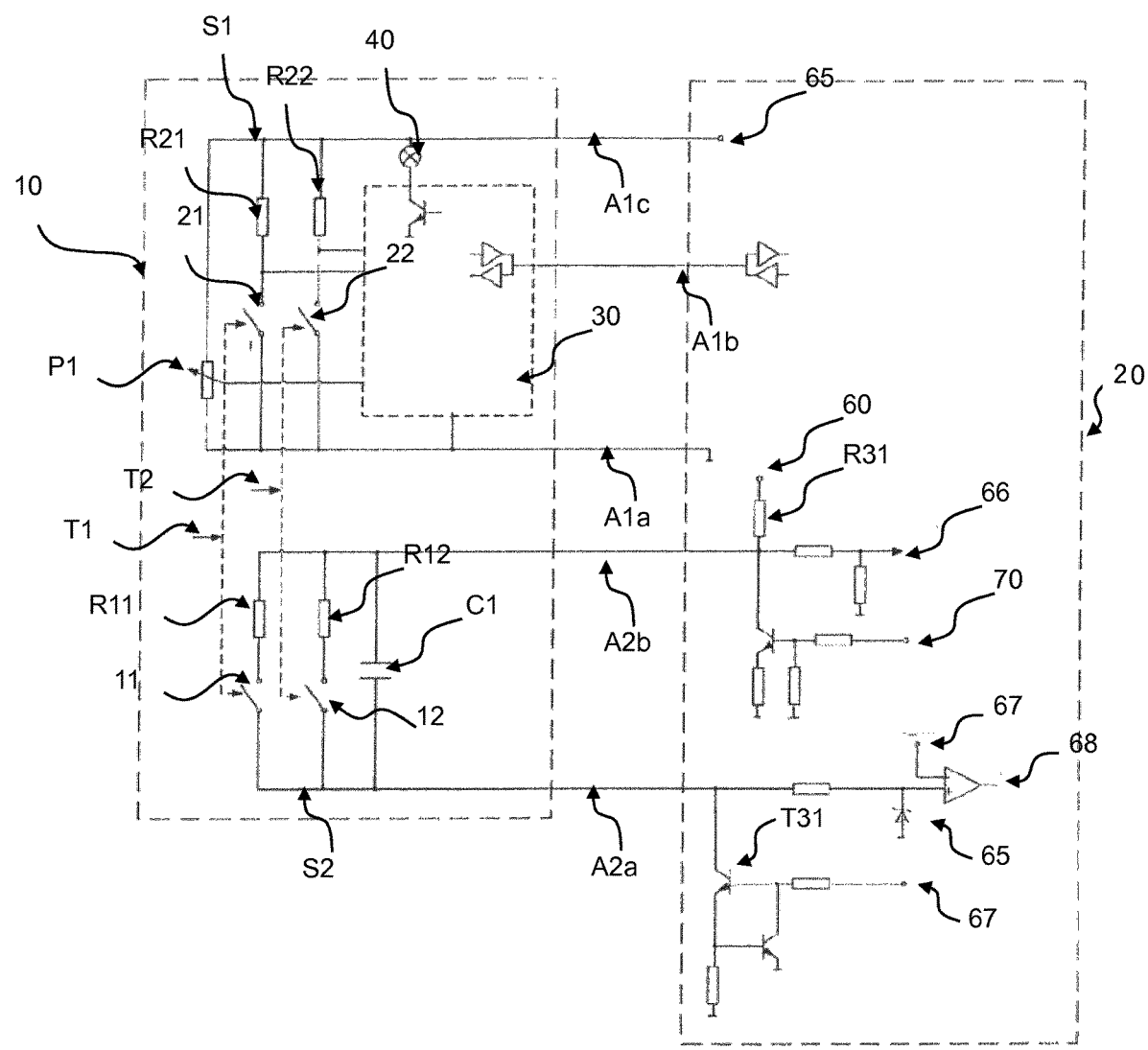
FIG. 2 shows a detailed representation of a preferred embodiment of the dual circuit transmission device.

FIG. 2 shows the internal structure, or the circuit of a preferred device 50 for controlling and regulating an electro-pneumatic parking brake circuit which is not shown here. As in FIG. 1, a manual control unit (HCU) 10 is connected to the control electronics (ECU) 20 by means of digital connection cables A1a, A1b, A1c and analog connection cables A2a, A2b. In the diagram shown, the digital connection cables A1a, A1b, A1c and analog connection cables A2a, A2b between the manual control unit (HCU) 10 and the control electronics (ECU) are connected 20 point-to-point.

In the representation shown, the manual control unit HCU comprises the first circuit arrangement S1 and the second circuit arrangement S2. The first circuit arrangement S1 and the second circuit arrangement S2 are redundant and preferably actuated simultaneously.

The first circuit arrangement S1 is a digital circuit arrangement. The digital connection cables A1a, A1b, A1c are digital data transmission channels that enable two-way digital data transmission between the manual control unit HCU and the control electronics ECU. The second circuit arrangement S2 is an analog circuit arrangement. The connecting cables A2a, A2b are analog data transmission channels that enable analog data transmission from the manual control unit HCU to the control electronics (ECU).

The digital circuit arrangement S1 comprises a first switching contact 21, which is connected in series with a resistor R21. Connected in parallel with the first switching contact 21 and the resistor R21 (preferably 10 kOhm), the digital circuit arrangement S1 has a second switching contact 22, which is connected in series with a resistor R22 (preferably 10 kOhm). In a diagram which is not shown here, a first and a second switching contact are provided twice, which can lead to an increase in functional reliability. The digital circuit arrangement S1 is connected to the input voltage (UD) 65 via the digital data transmission channel A1c.

The digital circuit arrangement S1 also has an interface module 30. This is connected to the control electronics (ECU) 20 via a bidirectional digital data transmission channel A1b. In the representation shown, the interface module 30 transmits the information about the switching state of the first switching contact 21 or the information about the switching state of the second switching contact 22 or both to the control electronics (ECU) 20 via the digital data transmission channel A1b.

In the interface module, a manually actuated proportional encoder signal can also be read in, which is transmitted from the proportional encoder P1 to the interface module in the representation shown. As a result of the fact that the digital data transmission channel A1b is provided for bidirectional data transmission, the status of a parking brake which is not shown here can be displayed by the function monitoring lamp 40. In an embodiment which is not shown here, a function control lamp or a fault control lamp is integrated into an operating element in the vehicle.

The second circuit arrangement S2 is an analog circuit arrangement, which comprises a first redundant switching contact 11, which is connected in series with a resistor R11 (preferably 10 kOhm). The analog circuit arrangement S2 has a second redundant switch 12 which is connected in parallel with the first redundant switching contact 11 and the resistor R11 and which is connected in series with a resistor R12 (preferably 10 kOhm). In a representation that is not shown here, a first redundant switching contact and a second redundant switching contact can also be provided twice. Again connected in parallel with the second redundant switch 12 and the resistor R12, the analog circuit arrangement S2 has a capacitor C1, preferably with a capacitance of 100 nF. The capacitor C1 is further used to discharge itself, and thereby to achieve contact cleaning, via the switching contacts 11 and/or 12 when these are closed.

The manual control unit (HCU) 10 has a first button T1. The first switching contact 21 of the digital circuit arrangement S1 and the first redundant switching contact 11 of the analog circuit arrangement S2 can be operated by means of the first button T1. In particular, the first switching contact 21 and the first redundant switching contact 11 can be actuated together. In an exemplary embodiment that is not shown here, a first button is provided for activating or deactivating a parking brake.

The manual control unit (HCU) 10 also has a second button T2. The second switching contact 22 of the digital circuit arrangement S1 and the second redundant switching contact 12 of the analog circuit arrangement S2 can be actuated redundantly by means of the second button T2. In particular, the second switching contact 22 and the second redundant switching contact 12 can be actuated together, i.e. simultaneously. In an embodiment which is not shown here, a second button is provided for activating a trailer test function.

In the embodiment shown, no quiescent current flows. Only when the first button T1 or the second button T2 is actuated is the operating current of the control electronics (ECU) 20 switched on. Advantageously, the service life of a vehicle battery which is not shown here can be extended.

The analog circuit arrangement S2 is used for redundancy and is provided for an emergency function in the event of a first fault and for a wake-up of the control electronics (ECU) 20. The analog data transmission channel A2b is connected to the battery voltage (UB) 60, among other things via a resistor R31. The battery voltage (UB) 60 is switched and can be evaluated to detect wiring faults (UT) 66. For example, short circuits after the battery voltage or the mass potential result in voltage levels that deviate from the voltage levels when the switch is open or closed. Such a deviation can be detected by evaluating the battery voltage.

Furthermore, it may be necessary to check the data transmission channels A2a and A2b sporadically by means of a test circuit 70 because of a lack of a quiescent current. In the event of intact data transmission channels A2a and A2b, the discharge of the capacitor C1 via the internal resistors of the data transmission channels A2a and A2b as well as the test circuit 70 results in a characteristic sloping voltage profile of the input voltage UD, which can be evaluated by means of the control electronics (ECU) 20.

The analog data transmission channel A2a is connected to the ground potential (URef) 67 via an overcurrent protector T31 to increase the short-circuit strength in the input circuit of the control electronics (ECU) 20. Furthermore, the analog data transmission channel A2a is used for the wake-up 68 of the control electronics (ECU) 20.

In the event that a vehicle which is not shown here is not in operation and is started, for example, by turning an ignition key, control electronics (ECU) can be switched on by means of a wake-up function. The control electronics (ECU) could then evaluate received data signals and correspondingly control the application or the release of a parking brake which is not shown here.

Figure 3:
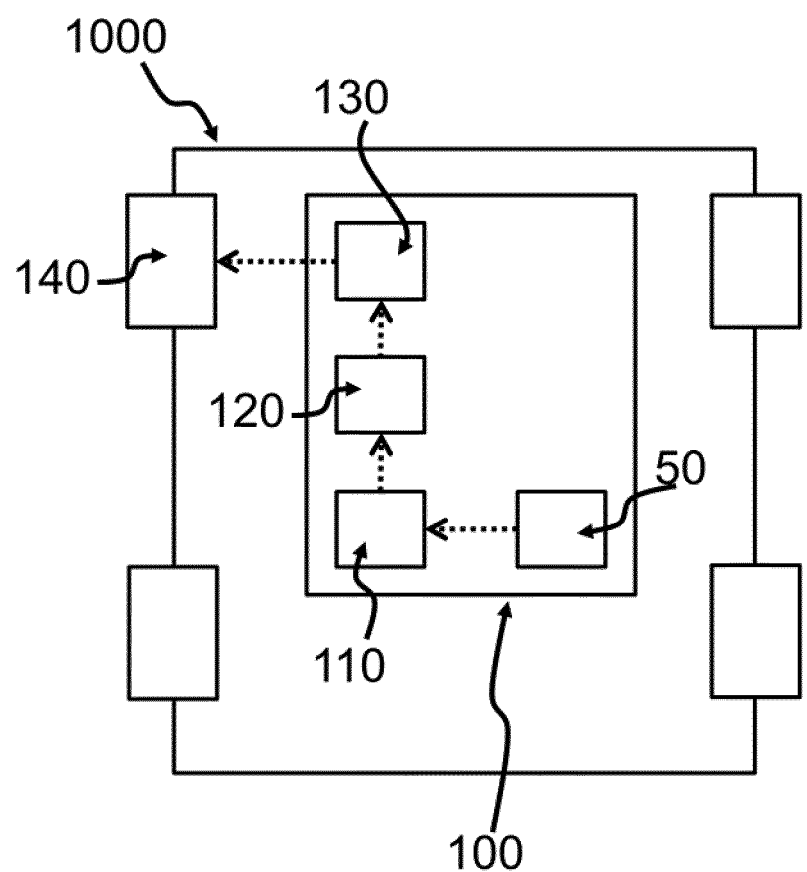
FIG. 3 shows a schematic representation of a vehicle with an electro-pneumatic handbrake (EPH) system.

FIG. 3 shows a vehicle 1000 with wheels 140, wherein the vehicle 1000 has an electro-pneumatic handbrake (EPH) system 100 according to a preferred embodiment. The electro-pneumatic handbrake (EPH) system 100 comprises a device 50 for controlling and regulating an electro-pneumatic parking brake circuit 110. In an embodiment which is not shown here, a device for controlling and regulating an electro-pneumatic parking brake circuit comprises a manual control unit (HCU), which is connected to control electronics (ECU) by means of a dual circuit transmission device. A corresponding device can be designed in an embodiment which is not shown here, for example as shown in FIG. 2.

The electro-pneumatic hand brake (EPH) system 100 also has an electro-pneumatic parking brake circuit 110, with which at least one spring storage brake cylinder 120 can be ventilated or vented. According to the ventilation or venting condition of the at least one spring storage brake cylinder 120, a parking brake 130 can be released or applied. The electro-pneumatic parking brake circuit 110 is controlled by means of a device 50 in the representation shown.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

10 hand control unit (HCU)
20 control electronics (ECU)
21 first switching contact
22 second switching contact
11 first redundant switching contact
12 second redundant switching contact
30 interface module
40 function monitoring lamp
50 device
60 battery voltage (UB)
65 input voltage (UD)
66 detection of cabling faults (UT)
67 mass potential (URef)
68 wake-up function
70 test circuit
100 electro-pneumatic hand brake (EPH) system
110 electro-pneumatic parking brake circuit
120 spring-loaded brake cylinder
130 parking brake
140 wheels
1000 vehicle
A1(a,b,c) digital transmission channels
A2(a,b) analog transmission channels
C1 capacitor
P1 proportional encoder
R11, R12 resistances
R21, R22 resistances
R31 resistance
S1 digital circuit arrangement
S2 analog circuit arrangement
T1 first button
T2 second button
T31 overcurrent protection

The invention claimed is:

1. A device designed for controlling and regulating an electro-pneumatic parking brake circuit, the device comprising:
   a manual controller configured to actuate a parking brake via the electro-pneumatic parking brake circuit, the manual controller having a first circuit arrangement and a second circuit arrangement, the first circuit arrangement being a digital, bidirectional circuit arrangement and the second circuit arrangement being an analog circuit arrangement; and
   control electronics electrically connected to the manual controller,
   wherein the first circuit arrangement is connected to the control electronics via a first connection cable and the second circuit arrangement is connected to the control electronics via a second connection cable,
   wherein the first connection cable is a digital data transmission channel configured to enable a digital data transmission between the digital circuit arrangement and the control electronics,
   wherein the second connection cable is an analog data transmission channel configured to enable an analog data transmission from the analog circuit arrangement to the control electronics,
   wherein the digital circuit arrangement and the analog circuit arrangement are redundantly and simultaneously actuatable,
   wherein the analog circuit arrangement has a first redundant switching contact connected in series with a first resistor and a second redundant switching contact connected in series with a second resistor,
   wherein the second redundant switching contact and the second resistor are arranged in parallel with the first redundant switching contact and the first resistor, and
   wherein a capacitor is connected in parallel with the second redundant switching contact and the second resistor.

2. The device according to claim 1, wherein the manual controller includes a first button, the digital circuit arrangement has a first switching contact, wherein the first switching contact and the first redundant switching contact are actuated by the first button, and wherein the first button is provided for the activation or deactivation of at least one parking brake.

3. The device according to claim 2, wherein the manual controller further includes a second button, the digital circuit arrangement has a second switching contact, wherein the second switching contact and the second redundant switching contact are actuated by the second button, and wherein the second button is provided for activating a trailer test function.

4. The device according to claim 3, wherein the first button and the second button each have parallel guided electrically independent switching contacts, wherein the parallel guided independent switching contacts are configured to be actuated simultaneously.

5. The device according to claim 4, wherein the first button and the second button are designed as double rocker buttons.

6. The device according to claim 3, wherein the digital circuit arrangement has an interface module configured to transmit information about a switching state of the first switching contact and/or information about a switching state of the second switching contact to the control electronics via a digital data transmission channel.

7. The device according to claim 6, wherein the digital circuit arrangement also has a proportional encoder configured to transmit a proportional encoder signal to the interface module.

8. The device according to claim 7, wherein the proportional encoder is mechanically coupled to the first button.

9. The device according to claim 3, wherein the first redundant switching contact and/or the second redundant switching contact of the analog circuit arrangement are provided twice and/or the first switching contact and/or the second switching contact of the digital circuit arrangement are provided twice.

10. The device according to claim 1, wherein the analog circuit arrangement is provided for an emergency function in event of a first failure and for wake-up of the control electronics and the digital circuit arrangement is provided for a main signal transmission.

11. The device according to claim 1, wherein the digital data transmission channel is designed as a LIN bus having three cable wires, or as a CAN bus having four cable wires.

12. An electro-pneumatic hand brake system, comprising:
   at least one electro-pneumatic parking brake circuit with at least one spring storage brake cylinder for releasing and applying at least one parking brake;
   the device according to claim 1, the device being configured to control and regulate the electro-pneumatic parking brake circuit.

13. A vehicle, comprising the electro-pneumatic hand brake system according to claim 12.

14. A method for controlling and regulating an electro-pneumatic parking brake circuit for actuating a parking brake, the method comprising:
- actuating a first circuit arrangement and a second circuit arrangement of a manual controller,
- transmitting control signals via a first connection cable from the first circuit arrangement to control electronics, and
- transmitting control signals via a second connection cable from the second circuit arrangement to the control electronics,
- wherein the first circuit arrangement and the second circuit arrangement are operated redundantly and simultaneously, and
- wherein the first circuit arrangement is a digital circuit arrangement,
- wherein the first connection cable is a digital data transmission channel configured to enable a digital data transmission between the digital circuit arrangement of the manual controller and the control electronics,
- wherein the second circuit arrangement is an analog circuit arrangement,
- wherein the second connection cable is an analog data transmission channel configured to enable an analog data transmission from the analog circuit arrangement of the manual controller to the control electronics,
- wherein the analog circuit arrangement has a first redundant switching contact connected in series with a first resistor and a second redundant switching contact connected in series with a second resistor,
- wherein the second redundant switching contact and the second resistor are arranged in parallel with the first redundant switching contact and the first resistor, and
- wherein a capacitor is connected in parallel with the second redundant switching contact and the second resistor.

* * * * *